Aug. 2, 1949.  J. W. BEASLEY ET AL  2,478,079
MUD MIXER

Filed May 24, 1948  2 Sheets-Sheet 1

Inventors
JESSE W. BEASLEY,
LAWRENCE B. HABERLE,

By
Semmes, Keegin, Robinson & Semmes,
ATTORNEYS

Aug. 2, 1949. J. W. BEASLEY ET AL 2,478,079
MUD MIXER
Filed May 24, 1948 2 Sheets-Sheet 2

Inventors
JESSE W. BEASLEY,
LAWRENCE B. HABERLE,
By
Semmes, Keegin, Robinson & Semmes.
ATTORNEYS Patented Aug. 2, 1949

2,478,079

UNITED STATES PATENT OFFICE 2,478,079

MUD MIXER

Jesse W. Beasley and Lawrence B. Haberle, Jacksonville, Tex.; said Beasley assignor to Viola Beasley and said Haberle assignor to Ethel Haberle Application May 24, 1948, Serial No. 28,866

4 Claims. (Cl. 259—4)

This invention relates to a process and apparatus for conditioning mud for use in drilling wells, such as gas and oil wells, and more especially to a process and apparatus for efficiently mixing chemical conditioning materials and drilling mud to obtain a mud having the desired characteristics such as viscosity and density.

This application is a continuation-in-part of application Serial No. 671,597 filed May 22, 1946 entitled "Mud mixer."

Drilling muds used in the drilling of deep oil and gas wells are introduced into the top of a hollow drill stem and forced down through the drill stem to discharge from its lower end. The mud then flows up between the wall of the drill and the well and is discharged at the top of the well. The mud discharged from the top of the well flows to a pit from which a pump delivers it to the drill stem for recirculation through the well.

The mud passing over the surface of the bit at the lower end of the drill stem lubricates and cools the bit to protect it from excessive wear and high temperature. Perhaps the most important function of the mud, however, is to seal the well to prevent blow-off of gas from pockets encountered during the drilling of the well. In order to seal the well effectively and overcome the high pressures encountered in deep wells, it is necessary that the drilling mud have a relatively high density. It is also important to control the viscosity of the mud to aid its flow through the drill stem and up around the wall of the drill.

During the drilling of the wells the various clays and shales through which the drill passes contaminate the drilling mud and generally tend to increase its viscosity. The viscosity can, of course, be decreased by the addition of water, but this in turn reduces the density of the drilling mud and impairs its effectiveness in sealing the well. It is, consequently, necessary to add various chemicals to the drilling mud to adjust its physical properties.

It is an object of this invention to provide a machine and process for the condition of drilling mud used in the drilling of wells.

Another object of this invention is to provide a machine introducing controlled proportions of several chemicals into a drilling mud to give accurate control of the properties of the mud.

A further object of this invention is to provide a machine which draws chemicals in the desired proportions into a mixing chamber in which the chemicals are mixed thoroughly with the mud.

Still another object of this invention is to provide a machine which may be readily operated by a single operator who is also free to load the mud conditioning materials into the machine.

With these and other objects in mind as will become apparent in the following detailed description, this invention resides in a storage bin divided into a number of compartments for the reception of the mud treating chemicals. A screw conveyor passes through the storage bin and removes the chemicals therefrom in the proper proportions and discharges them into a mixing chamber. The drilling mud is injected at a high velocity into the mixing chamber for thorough mixing with the chemicals and discharged therefrom for use in the drilling operation.

Figure 1:
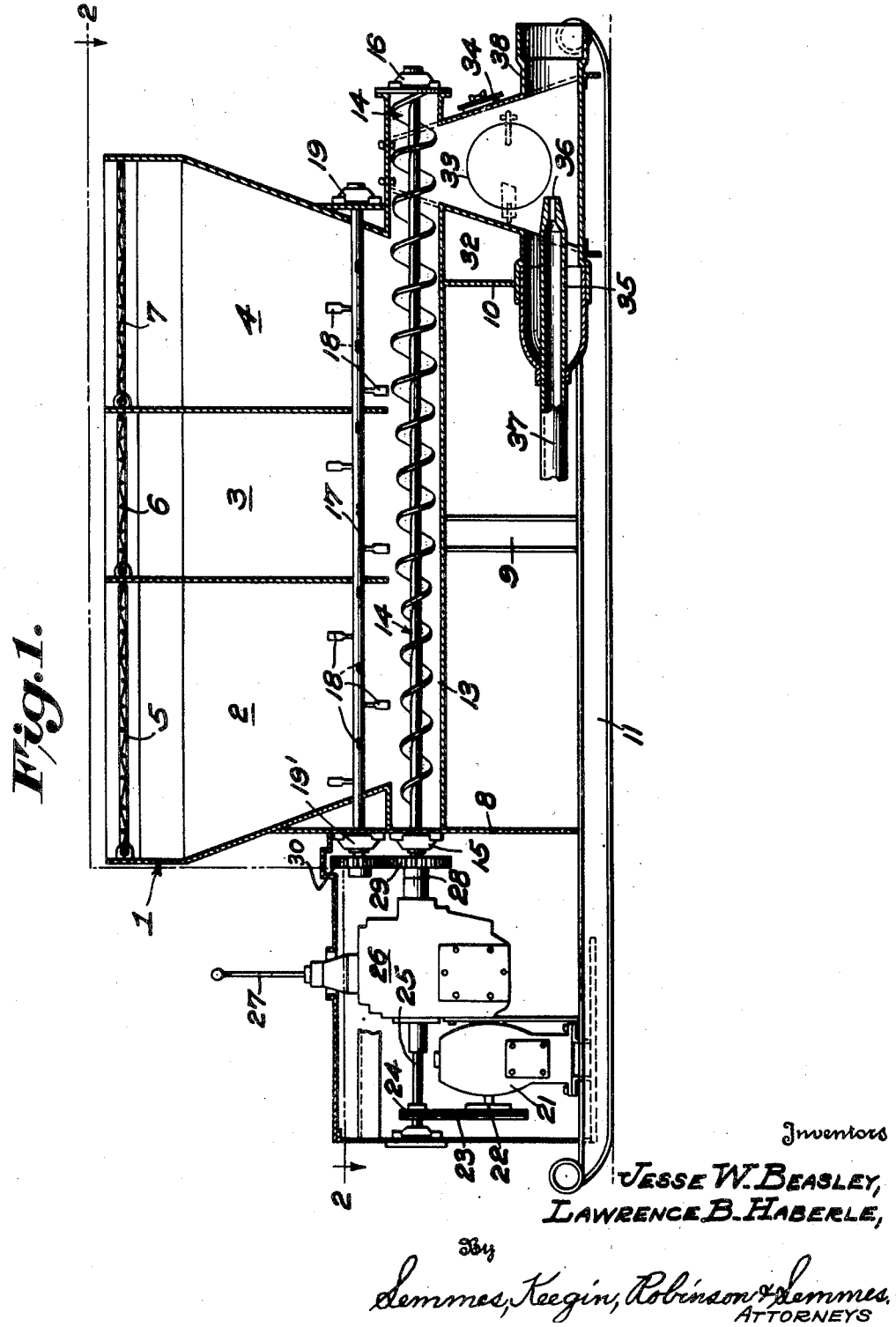
Figure 1 is a longitudinal vertical cross section of the apparatus of this invention.

Referring to Figure 1, a storage bin, indicated generally by 1, is illustrated. The storage bin 1 is divided into hoppers 2, 3, and 4, for the reception of the various mud treating chemicals. Each of the hoppers 2, 3, and 4 is covered with a screen 5, 6, and 7, respectively, which serves as a safety guard and prevents large particles which might clog the machine from entering the hopper. The storage bin is supported upon standards 8, 9, and 10 which extend upwardly from a pair of skids 11 and 12. The skids 11 and 12 facilitate the positioning of the machine at the well.

The hoppers 2, 3, and 4, which preferably taper toward their lower ends, open into the top of a channel 13 directly below the hoppers. A screw conveyor, indicated generally by 14, extends through the length of the channel 13 for movement of the chemicals from the hoppers to the discharge end of the conduit 13. The conveyor 14 is supported by any suitable bearings 15 and 16 at the driven and discharge ends of the conveyor, respectively. An agitator shaft 17, to which are secured a plurality of paddles 18, is positioned directly above the conveyor 14 and passes through the lower end of the hoppers 2, 3, and 4 substantially parallel to the conveyor 14. Agitator 17 turns in bearings 19 and 19' at the ends of the storage bin 1.

Figure 2:
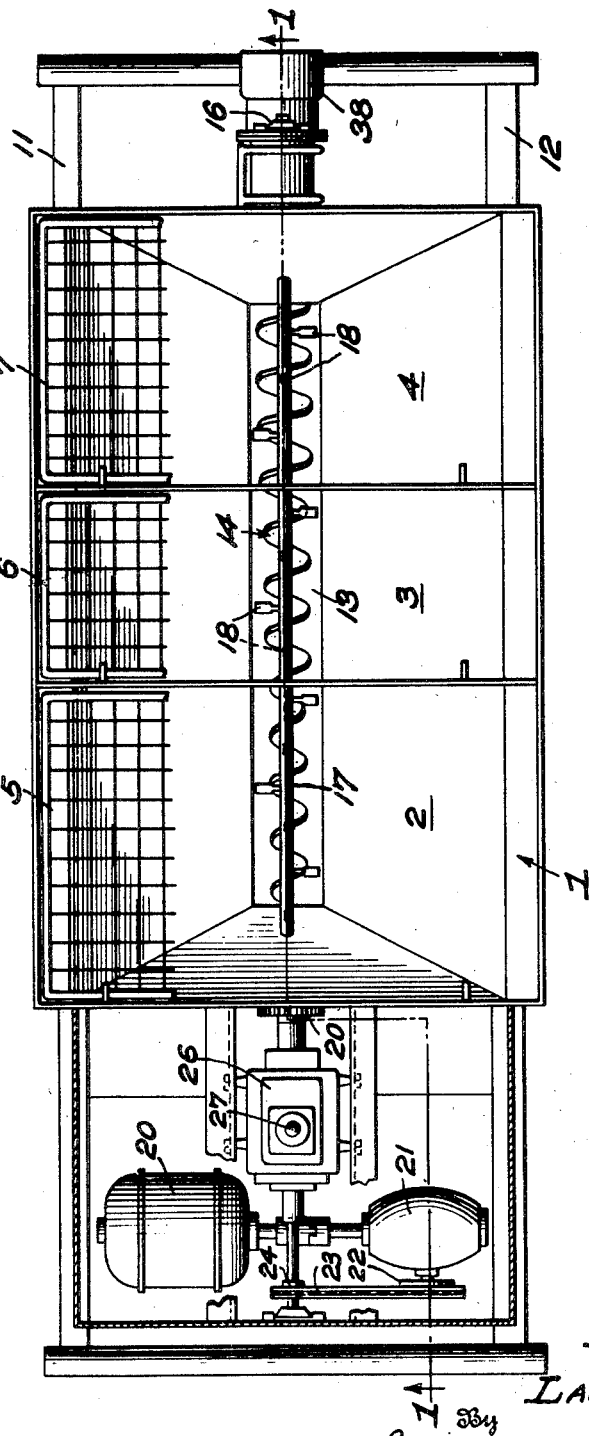
Figure 2 is a plan view, partly in section, along the section line 2—2 in Figure 1.

Referring to Figure 2, an electric motor 20 coupled to drive a speed reducer 21 is illustrated. The speed reducer 21 drives a shaft on which a sprocket 22 is keyed for the reception of a chain 23. The chain 23 engages a sprocket 24 mounted on a shaft 25 to transfer the power to a multispeed transmission 26. A gear shift lever 27 extends from the top of the transmission 26 to facilitate changing the gear ratio and thereby adjusting the rate of rotation of a shaft 28 delivering power from the transmission. The shaft 28 is coupled to the shaft of the conveyor 14. A spur gear 29 is keyed to shaft 28 and engages a similar gear 30 secured to an extension of the agitator shaft 17. Gears 29 and 30 combine to rotate the agitator 17 to break up the chemicals in the hoppers and prevent their "bridging" over the channel 13.

Any suitable speed reduction mechanism may be employed in the place of motor 20, speed reducing gear 21, and transmission 26 to provide control of the rate of rotation of the screw conveyor 14. In some instances it may be desirable to equip the electric motor 20 with a rheostat control to control the speed of the motor and thereby dispense with the transmission 26.

The bottom of the channel 13, at the discharge end of the conveyor, opens into a mixing chamber 32. The mixing chamber 32 is equipped with a removable plate 33 to allow access thereto for any cleaning or repairs. An air vent 34 is provided to relieve the vacuum on the mixing chamber in the manner hereinafter described.

A nozzle 35 has its outlet 36 in the lower end of the mixing chamber for the discharge of the mud to be conditioned. The nozzle 35 is connected with a pipe 37 from the discharge of a pressure pump, not shown, delivering the mud from a pit to the conditioning machine. An outlet 38 for the mixing chamber is provided at the lower end of the mixing chamber in alignment with the nozzle 35 for the discharge of the conditioned mud from the machine.

It will be noted that the diameter of the threads on the screw conveyor are stepped-up under the partitions dividing the storage bin into hoppers 2, 3, and 4 to control the amount of chemical withdrawn by the conveyor 14 from each of the hoppers. The diameter increases toward the discharge end of the conveyor 14 and the amount of increase in diameter at each step is adjusted to control the amount of conditioning material introduced from each hopper.

In operation, the hoppers 2, 3, and 4 are filled with the proper chemicals for conditioning the mud. Mud is drawn from the mud pit by the pressure pump and discharged at a high rate of speed through nozzle 35 into the mixing chamber 3. The motor 20 is then started and the conveyor 14 discharges the chemicals from the hoppers 2, 3, and 4 into the mixing chamber where they are thoroughly mixed with the mud discharged from nozzle 35. The mud and chemical mixture flows from the mixing chamber through outlet 38 and may be used directly in the well or may go to storage from which it is delivered to the well.

The high velocity of the mud flowing from the nozzle 35 acts as an ejector and tends to evacuate the mixing chamber and draw chemicals from the hoppers into the mixing chamber. The air vent 34 breaks the vacuum and thereby makes it possible to control accurately the rate at which the chemicals are added to the drilling mud by controlling the rate of rotation of the conveyor 14. If it is desired to change the amount of the chemical added to the mud, this may be easily accomplished by means of the transmission 26. The transmission 26 is merely shifted into a different gear ratio to change the rate of rotation of the conveyor 14.

The mud conditioning machine described herein provides thorough mixing of the mud with the chemical conditioning materials. The novel conveyor stucture allows accurate control of the proportions in which the various chemicals are added to the mud to produce a mud having properly balanced characteristics.

While the preferred modification of this invention has been described in detail, it is to be understood that the concept of the invention is not limited to those details, but falls within the scope of the appended claims.

We claim:

1. A mud mixing machine for conditioning drilling muds comprising a bin for the storage of conditioning materials, a partition joining the bin into compartments, a mixing chamber, a screw conveyor extending through the lower portion of the bin to deliver the conditioning materials into the mixing chamber, a nozzle opening into the mixing chamber for the discharge of mud into the chamber, an outlet from the mixing chamber in alignment with the nozzle opening, and a vent in the mixing chamber breaking the vacuum therein whereby the screw conveyor controls the rate of addition of the conditioning material.

2. A mud mixing machine for conditioning drilling mud comprising a bin for the storage of conditioning materials, a partition joining the bin into compartments, a mixing chamber, a screw conveyor extending through the lower portion of the bin to deliver the conditioning materials into the mixing chamber, the threads on said screw conveyor increasing in diameter from its end remote from the mixing chamber toward its discharge end to take conditioning material from each of the compartments, a nozzle opening into the mixing chamber for the discharge of mud into the chamber, an outlet from the mixing chamber in alignment with the nozzle opening, and a vent in the mixing chamber breaking the vacuum therein whereby the screw conveyor controls the rate of addition of the conditioning material.

3. A mud mixing machine for the conditioning of drilling muds comprising a storage bin for the conditioning materials, a mixing chamber, a screw conveyor in the lower portion of the bin discharging into the mixing chamber, a vertical partition in the storage bin extending substantially perpendicular to the conveyor and dividing the bin into compartments, the diameter of the threads on the screw conveyor being stepped up in the direction of travel of the conditioning material as the conveyor passes through successive compartments, a nozzle for discharging mud into the mixing chamber, an outlet from the mixing chamber, a vent in the mixing chamber breaking the vacuum therein whereby the screw conveyor controls the rate of addition of the conditioning materials, and means for regulating the speed of the conveyor.

4. A mud mixing machine for conditioning drilling muds comprising a bin for the storage of conditioning materials, a partition joining the bin into compartments, a mixing chamber, a screw conveyor extending through the lower portion of the bin to deliver the conditioning materials into the mixing chamber, the threads on said screw conveyor increasing in diameter from its end remote from the mixing chamber toward its discharge end to take conditioning material from each of the compartments, an agitator extending through the bin above the conveyor, a nozzle opening into the mixing chamber for the discharge of mud into the chamber, an outlet from the mixing chamber in alignment with the nozzle opening, and a vent in the mixing chamber breaking the vacuum therein whereby the screw conveyor controls the rate of addition of the conditioning material.

JESSE W. BEASLEY.
LAWRENCE B. HABERLE.

REFERENCES CITED

The following references are of record in the file of this patent:

UNITED STATES PATENTS

| Number | Name | Date |
|---|---|---|
| 1,448,608 | Tybout | Mar. 13, 1923 |
| 1,731,953 | Thomson | Oct. 15, 1929 |
| 2,096,174 | Hamill | Oct. 19, 1937 |
| 2,338,174 | Garrison | Jan. 4, 1944 |

FOREIGN PATENTS

| Number | Country | Date |
|---|---|---|
| 145,081 | Austria | Mar. 25, 1936 |